United States Patent [19]
Garritsen et al.

[11] 3,919,197
[45] Nov. 11, 1975

[54] PREPARATION OF BETA-ALKOXY-OMEGA-LACTAMS

[75] Inventors: Johan W. Garritsen, Sittard; Josef M. Penders, Maastricht, both of Netherlands

[73] Assignee: Stamicarbon B.V., Geleen, Netherlands

[22] Filed: Dec. 5, 1973

[21] Appl. No.: 422,007

[30] Foreign Application Priority Data
Dec. 8, 1972 Netherlands .................. 7216662

[52] U.S. Cl. ............ 260/239.3 A; 260/239.3 R; 260/293.86
[51] Int. Cl.² ............ C07D 211/22; C07D 223/08; C07D 225/02
[58] Field of Search ............ 260/239.3 A, 293.86

[56] References Cited
UNITED STATES PATENTS
2,071,253 2/1937 Carothers .................. 260/239.3 A
3,485,821 12/1969 Sheehan .................. 260/239.3 A
3,562,254 2/1971 Sheehan .................. 260/239.3 A FOREIGN PATENTS OR APPLICATIONS
1,035,139 7/1958 Germany .................. 260/239.3 A
634,718 1/1962 Canada .................. 260/239.3 A Primary Examiner—Henry R. Jiles
Assistant Examiner—Robert T. Bond
Attorney, Agent, or Firm—Cushman, Darby & Cushman

[57] ABSTRACT

A beta-alkoxy-omega-lactam is prepared by subjecting to heating in the liquid phase an omega-amino-beta-alkoxy-carboxylic acid ester. The heating may be carried out at a temperature of 150° to 350°C. If the amino compound is prepared by hydrogenation of the corresponding cyano compound, it is not necessary to separate the amino compound from the reaction mixture. The lactams obtained may be applied for preparation of polyamides and copolyamides.

5 Claims, No Drawings

PREPARATION OF BETA-ALKOXY-OMEGA-LACTAMS

This invention relates to a process for preparing β-alkoxy-ω-lactams, which lactams may be used for the preparation of polyamides and copolyamides.

It is known that by the dehydrobromination of α-bromine-ε-caprolactam with a sodiumalkoxide, the corresponding β-alkoxy-ε-caprolactam can be obtained (Journal of Organic Chemistry, volume 34, 1969, pages 959–963). However, the dehydrobromination reaction is complex and is not suitable for practical applications, and furthermore only moderate yields of the desired alkoxylactam are obtained.

The invention is directed to a simple method for the preparation of ω-lactams, and provides a process for preparing a β-alkoxy-ω-lactam, comprising heating in the liquid phase an ω-amino-β-alkoxycarboxylic acid ester of the general formula

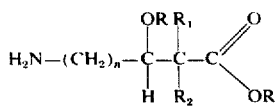

wherein $n$ is an integer of from 2 to 6, the two R groups which may be the same or different each represent an alkyl group or a cyclo-alkyl group, containing not more than 10 carbon atoms, and $R_1$ and $R_2$, which may be the same or different each represent hydrogen or an alkyl group or a cyclo-alkyl group containing not more than 10 carbon atoms.

In the process according to the invention cyclization takes place between the amino group and the carbon atom of the ester group with the formation of an alcohol ROH in which R has the same meaning as in the ester group. It is surprising that cyclization does not take place between the amino group and the carbon atom to which the alkoxy group is bound, to any substantial extent. The alcohol formed during the cyclization reaction can be recovered from the reaction mixture by distillation.

The β-alkoxy-ω-lactams obtained by the process according to the invention may be represented by the general formula

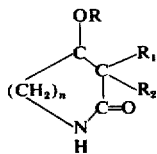

in which $n$, R, $R_1$ and $R_2$ have the meanings hereinbefore set forth.

The ω-amino-β-alkoxy-carboxylic acid esters for the cyclization according to the invention can be prepared by reaction of an ω-cyano-acetal with a ketene, to form an ω-cyano-β-alkoxy-carboxylic acid ester as described in U.S. Pat. Application No. 396,665, filed Sept. 13, 1973, which is hereby incorporated by reference, and by subsequent hydrogenation of the cyano-group of the said ester.

Preferably the starting material is an amino-ester according to the general formula hereinbefore set forth wherein n is 3 or 4 and both R groups represent a methyl- or an ethyl-group, the two R groups being identical, and $R_1$ and $R_2$ represent hydrogen. Such amino-esters may be prepared by reaction of ketene and the acetal of β-cyanopropionaldehyde or γ-cyanobutyraldehyde respectively and methyl- or ethyl-alcohol, followed by hydrogenation of the cyano-group.

The process according to the invention may be carried out preferably at a temperature from 150° to 350°C. At temperatures in excess of 350°C the efficiency decreases and at temperatures below 150°C, the reaction proceeds only very slowly. The pressure is not critical but should be selected so that at the reaction temperature a liquid-phase is formed.

The cyclization according to the invention may be carried out in a solvent, e.g. water, dioxane, methanol, ethanol, ethyl acetate, cyclohexane and methylcyclohexane. If the amino compound to be cyclized is prepared by hydrogenation of the corresponding cyano compound, it is not necessary for the amino compound to be separated as such from the reaction mixture obtained during said hydrogenation, as the said reaction mixture is suitable as such for cyclization conditions.

The following Examples of the invention are provided. The cyanoester starting material in the Examples was obtained by the method described in U.S. Pat. Application No. 396,665, filed September 13, 1973, which is hereby incorporated by reference.

EXAMPLE I 20.3 g of δ-cyano-β-methoxy-butanecarboxylic acid methyl-ester, 230 millilitres of dioxane, and 1.1 g of Raney nickel were introduced into a 500-millilitre autoclave equipped with a stirrer. The autoclave was flushed with nitrogen and 21 g of liquid ammonia added hereto, and hydrogen introduced into the autoclave until the pressure therein reached about 80 atmospheres. The mixture in the autoclave was then vigorously stirred for 1 hour at about 100°C. After cooling to room temperature the autoclave is opened, the ammonia removed by evaporation, the Raney nickel filtered off and the filtrate concentrated by evaporation. 25 g of residue were obtained which were found to contain 19 g of ε-amino-β-methoxy-pentanecarboxylic acid methyl ester and 5.25 g of dioxane, the residue containing no starting material. The reaction efficiency was 92 %. By distillation at reduced pressure the amino-ester was obtained in a practically pure condition (boiling point 84°–86°C at 1.3 millimetres Mercury; $n_D^{20}$ = 1.4469).

15 g of the ε-amino-β-methoxy-pentane-carboxylic acid methyl ester thus obtained were dissolved in 160 g of dioxane in a 500-millilitre autoclave, provided with a stirrer. The autoclave was flushed with nitrogen and the solution in the autoclave heated for 1 hour at 260°–265°C, during which the pressure in the autoclave reached approximately 20 atmospheres.

After cooling the autoclave is opened and the reaction mixture obtained concentrated by evaporation to obtain 15 g of residue containing 11 % by weight of non-converted starting product and 60 % by weight of β-methoxy-ε-caprolactam, corresponding to a conversion of 89 % and an efficiency based on the converted product, of 83 %.

EXAMPLE II 20.1 g of δ-cyano-β-methoxy-butanecarboxylic acid methyl ester, 240 millilitres of dioxane, and 1 g of Raney nickel were introduced into a 500 millilitre autoclave provided with a stirrer. The autoclave was flushed with nitrogen and 28 g of liquid ammonia added. Hydrogen was introduced into the autoclave until the pressure therein reached 80 atmospheres. The mixture was then vigorously stirred for 1 hour at a temperature of about 90°C and the stirring continued a further hour at a temperature of 200°C.

After cooling the autoclave was opened and the ammonia removed by evaporation, the Raney nickel filtered off, and the filtrate concentrated by evaporation. 19 g of residue were obtained containing no starting material and containing 3.8 g of dioxane together with 13.1 g of β-methoxy-ε-caprolactam. The reaction efficiency was 78 % based on the starting cyano-ester.

By distillation of the residue at reduced pressure, practically pure β-methoxy-ε-caprolactam was obtained (boiling point 166°C at 9 millimetres Mercury, melting point 54°–56°C).

What is claimed is:

1. A process for preparing a β-alkoxy-ω-lactam, comprising heating in the liquid phase an ω-amino-β-alkoxycarboxylic acid ester of the formula

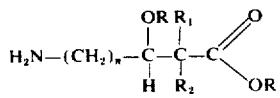

wherein $n$ is an integer of from 2 to 6, the two R groups which may be the same or different each represent an alkyl group or a cyclo-alkyl group, containing not more than 10 carbon atoms, and $R_1$ and $R_2$, which may be the same or different each represent hydrogen or an alkyl group or a cyclo-alkyl group containing not more than 10 carbon atoms.

2. A process according to claim 1, wherein the ester starting material is according to the said general formula wherein $n$ is 3 or 4, R represents a methyl-group or an ethyl group, the two R-groups are identical and $R_1$ and $R_2$ represent hydrogen.

3. A process according to claim 1, wherein the reaction is carried out at a temperature of from 150° to 350°C.

4. A process according to claim 1, wherein the reaction is carried out in the presence of a solvent.

5. A process according to claim 1, wherein the reaction mixture containing the amino-ester starting material is obtained by hydrogenation of the corresponding cyano-ester.

* * * * *